Patented Oct. 27, 1925.

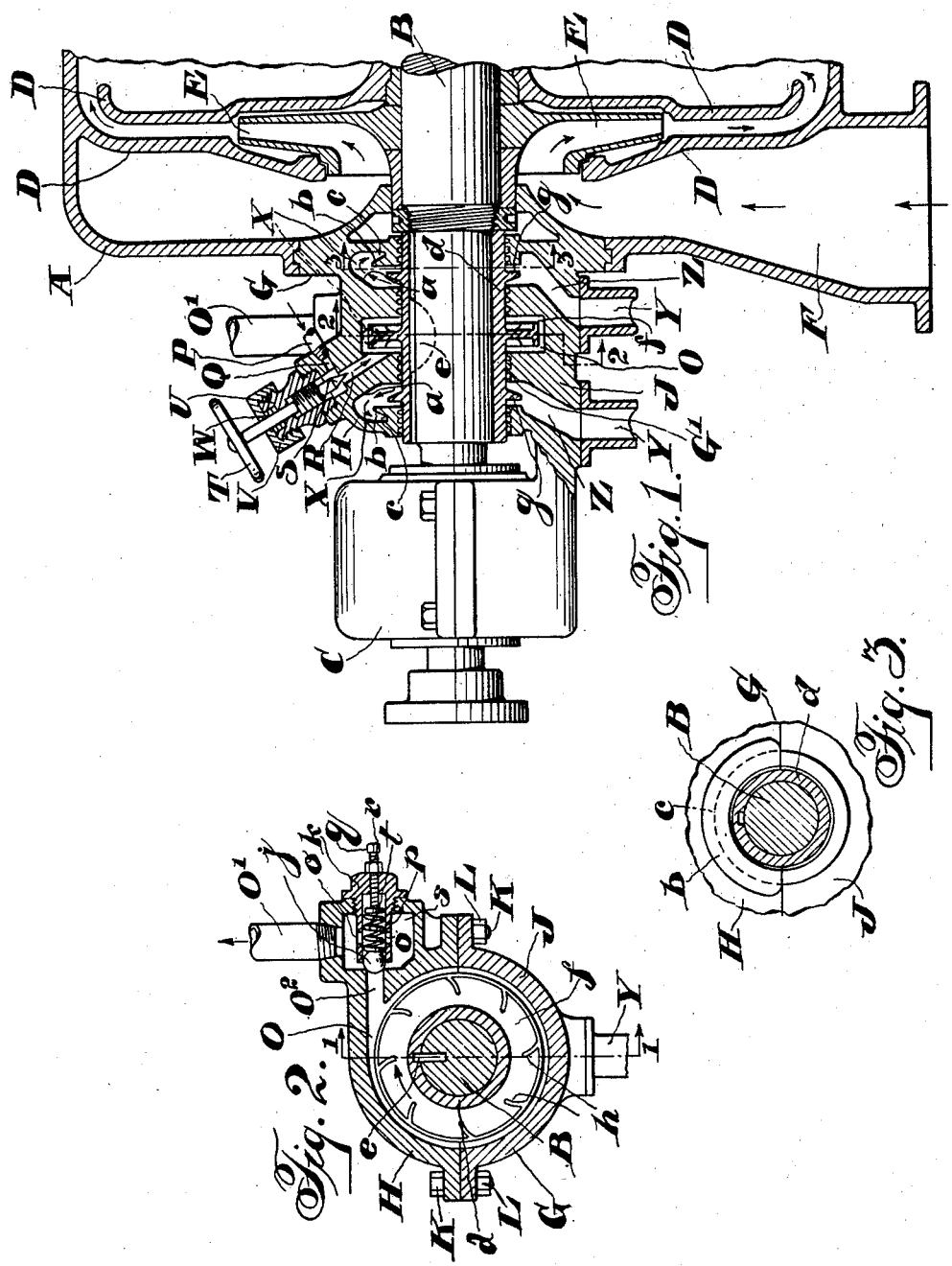

1,558,630

UNITED STATES PATENT OFFICE.

ROBERT H. REED, OF EASTON, PENNSYLVANIA, ASSIGNOR TO INGERSOLL-RAND COMPANY, OF JERSEY CITY, NEW JERSEY, A CORPORATION OF NEW JERSEY.

HYDRAULIC SEAL FOR ROTARY ENGINES.

Application filed February 18, 1924. Serial No. 893,840.

*To all whom it may concern:*

Be it known that I, ROBERT H. REED, a citizen of the United States, and a resident of Easton, county of Northampton, and State of Pennsylvania, have invented a certain Hydraulic Seal for Rotary Engines, of which the following is a specification accompanied by drawings.

This invention relates to rotary engines, pumps, compressors or other similar machines having a rotary part and a stationary part, but more particularly to a hydraulic seal for such machines from which it is desired to prevent the escape of fluid except through the proper channels.

Fluids, such as ammonia gas, which are injurious to health, inflammable or harmful in some other respect, are often supplied to rotary engines, pumps, turbo compressors or other similar machines, and it is essential that these fluids be prevented from escaping from the casing of the machine except through the proper channels. The greater part of these machines may be easily insulated from the atmosphere but it has been found to be a difficult problem to prevent the escape of fluids from between the rotating shaft and the casing of the machine without materially reducing the horse-power of the machine and thereby diminishing its efficiency. Ordinary packings, such as felt or well known compositions, are obviously impractical for this purpose because they either wear cut too quickly or create an excessive amount of friction on the shaft.

One satisfactory means for creating a seal between a rotary part and a stationary part of a machine is by means of introducing liquid, such as water, into a chamber which surrounds the rotary part and maintaining a constant circulation of liquid in this chamber. In order to obtain an efficient liquid seal, however, the liquid pressure in this chamber must be proportional to the velocity of the shaft, so that there will be sufficient liquid to create an effective seal but not an excessive amount to reduce the horse-power of the machine. It is also desirable that the liquid be prevented from flowing along the rotary part into the working parts of the machine so as not to interfere with the smooth running of the machine.

One object of this invention is to produce an efficient hydraulic seal between a rotary part and a stationary part of the machine and to prevent the liquid in the seal from flowing along the rotary part into the working parts of the machine.

A further object of the invention is to enable the liquid pressure in a hydraulic seal to be automatically controlled, so as to be maintained substantially constant irrespective of the liquid pressure in the supply line.

Further objects of this invention will hereinafter appear and the invention is shown in one of its preferred forms in the accompanying drawings in which—

Figure 1 is a longitudinal sectional view taken on the line 1—1 of Figure 2 looking in the direction of the arrows, Figure 2 is a transverse sectional view taken on the line 2—2 of Figure 1 looking in the direction of the arrows, and Figure 3 is a transverse section taken on the line 3—3 of Figure 1 looking in the direction of the arrows.

Referring to the drawings, the invention is shown applied to a turbo blower, only a portion of which is shown sufficient for illustrative purposes, but it is to be understood that this invention is applicable to any other analogous type of machine, such as a pump, a rotary engine or turbo compressor, in which it is desired to maintain a seal between a rotary part and a stationary part of the machine. A designates a turbo blower which surrounds a rotary shaft B which in this instance is mounted in a bearing box C. The turbo blower is shown provided with the usual diaphragms D and impellers E, and fluid is introduced into the machine through the inlet F.

A packing box G is suitably connected to the casing A and in this instance surrounds a portion of the rotary shaft B adjacent one end thereof. The packing box G is preferably formed in two sections H and J which are secured together by bolts K and nuts L, and is in this instance formed with series of annular grooves G' forming a labyrinth. In this instance, an annular chamber O is formed in the packing box G and liquid, such as water, is adapted to be supplied to the chamber O through a supply line P and passages Q and R in the packing box G. A discharge line O' preferably communicates with the chamber O through a passage O² and enables the liquid to pass from the chamber O to any suitable place outside the machine.

Any suitable means may be employed for regulating the flow of liquid into the chamber O and in this instance a needle valve S, having a hand wheel T, extends into the passage R which leads to the chamber O. By manipulating the hand wheel T, the flow of liquid into the chamber O may be varied as desired. The needle valve S is preferably mounted in a plug U which is screwed into the packing box G, and a cap V is screwed over the plug U for holding a suitable packing W about the needle valve S in order to prevent the escape of liquid past the needle valve.

Annular chambers X are preferably formed in the packing box G on opposite sides of the chamber O. Each of these chambers X is in communication with discharge lines Y by means of passages Z in the packing box G. Hereinafter for the sake of convenience the chamber O will be termed the "auxiliary chamber" and the chambers X will be termed "secondary chambers". One wall a of each of the secondary chambers X is preferably inclined away from the auxiliary chamber O, and in this instance, semi-circular flanges or partitions b are formed on the packing box G, and extend into the secondary chambers X, and a groove c is preferably formed between each of these partitions b and the packing box for the purpose hereinafter described.

A sleeve d is in this instance secured to the shaft B by a suitable key e and is preferably formed with a central ring f, which is adapted to extend into the auxiliary chamber O and rings g are provided on each side of the central ring f, which are in this instance somewhat smaller in diameter and extend into the secondary chambers X. The central ring f is preferably formed with suitable baffles h to aid in maintaining a constant circulation of liquid in the chamber O.

In the operation of the hydraulic seal so far described, liquid is introduced into the auxiliary chamber O through the supply line P and the flow thereto is regulated by the needle valve S. Assuming that the shaft B is rotating, the ring f will maintain a constant circulation of liquid in the auxiliary chamber O by forcing this liquid into the discharge line O'. Some liquid from the chamber will seep along the labyrinth G' into the secondary chambers X at opposite sides of the auxiliary chamber O and the rings g will throw the liquid in the secondary chambers X against the inclined walls a, which will direct the liquid into the grooves c from which it will flow from the packing box G through the discharge lines Y. In this manner liquid is prevented from flowing from the packing box G into the working parts of the machine enclosed by the main casing A. The liquid in the packing box G prevents the fluid in the main casing A from escaping to atmosphere between the packing box and the rotating shaft B.

In order to regulate the liquid pressure in the auxiliary chamber O, a suitable valve $j$ in this instance in the form of a ball is adapted to close the passage $O^2$. A hollow plug $k$ having one end closed is preferably screwed into the section H of the packing box G and is in this instance formed with radial ports o. A coil spring t is mounted in the hollow bore p of the plug k and bears against the ball valve j to normally maintain the valve seated. In order to vary the tension of the spring t the head q of a set screw r bears against one end of the spring t and by manipulating the said screw r the liquid pressure in the auxiliary chamber O may be varied as desired. If the liquid pressure in the auxiliary chamber O is sufficient to overcome the resistance of the coil spring t, the ball valve j will be unseated and liquid may be permitted to flow from the auxiliary chamber O into the discharge pipe O' but until this has been reached the valve j remains closed so that an efficient hydraulic seal about the shaft B will be maintained at all times. In this instance a trap s is formed in the section H of the packing box G and enables the liquid to flow substantially unrestricted from the auxiliary chamber O.

I claim:

In a machine of the class described, the combination with a main casing, of a rotary shaft in said casing, an auxiliary chamber associated with said shaft and main casing and adapted to be supplied with liquid under pressure, supply and discharge lines for the liquid in said auxiliary chamber, manually operable means for controlling the flow of liquid to said auxiliary chamber, a rotary impeller extending into said auxiliary chamber adapted to create a hydraulic seal therein for the shaft, secondary chambers associated with said auxiliary chamber adapted to receive a portion of the liquid therefrom, said secondary chambers being formed with an inclined wall and a groove, an impeller in each of said secondary chambers adapted to throw the liquid against said inclined wall, whereby the liquid will flow into said groove, discharge lines for said secondary chambers, and a manually adjustable spring pressed valve in the discharge line of said auxiliary chamber for maintaining substantially constant liquid pressure in said auxiliary chamber.

In testimony whereof I have signed this specification.

ROBERT H. REED.